US012213477B2

(12) United States Patent
Hessler

(10) Patent No.: US 12,213,477 B2
(45) Date of Patent: Feb. 4, 2025

(54) TURTLE DECOY FOR GAME FISHING OR RESEARCH

(71) Applicant: Don Bitler Hessler, Galloway, NJ (US)

(72) Inventor: Don Bitler Hessler, Galloway, NJ (US)

( * ) Notice: Subject to any disclaimer, the term of this patent is extended or adjusted under 35 U.S.C. 154(b) by 0 days.

(21) Appl. No.: 18/360,329

(22) Filed: Jul. 27, 2023

(65) Prior Publication Data

US 2024/0349715 A1   Oct. 24, 2024

Related U.S. Application Data

(60) Provisional application No. 63/460,772, filed on Apr. 20, 2023.

(51) Int. Cl.
*A01M 31/06* (2006.01)
*A01K 97/02* (2006.01)
*A01M 31/00* (2006.01)

(52) U.S. Cl.
CPC .......... *A01M 31/06* (2013.01); *A01K 97/02* (2013.01); *A01M 31/008* (2013.01)

(58) Field of Classification Search
CPC ...... A01K 97/02; A01M 31/06; A01M 31/008
See application file for complete search history.

(56) References Cited

U.S. PATENT DOCUMENTS

| 2,516,133 | A | * | 7/1950 | Martin | A01K 85/18 43/26.2 |
|---|---|---|---|---|---|
| 2,607,151 | A | * | 8/1952 | Morris | A01K 85/18 43/42.3 |
| 2,612,718 | A | | 10/1952 | Steinberg | |
| 2,749,647 | A | * | 6/1956 | Beloff | A01K 85/01 D22/133 |
| 3,780,467 | A | | 12/1973 | Lueck | |
| 3,974,591 | A | | 8/1976 | Ray | |
| 4,051,620 | A | | 10/1977 | Yasuda et al. | |
| 4,267,658 | A | | 5/1981 | Brown et al. | |
| 4,554,756 | A | | 11/1985 | Thomas | |
| 5,033,227 | A | | 7/1991 | Coxwell | |
| 5,054,230 | A | | 10/1991 | Woodman | |
| 5,428,921 | A | | 7/1995 | Lancieri | |
| 6,082,035 | A | * | 7/2000 | Groff | A01M 29/06 43/2 |
| 6,176,047 | B1 | * | 1/2001 | Morningstar | A01M 31/06 D21/603 |
| 6,516,554 | B1 | | 2/2003 | Page et al. | |
| 6,931,785 | B1 | * | 8/2005 | Johnson | A01K 85/16 43/42.26 |
| 7,520,086 | B2 | | 4/2009 | Melhorn et al. | |
| 8,006,465 | B1 | * | 8/2011 | Albert, III | A01M 31/06 53/413 |
| D654,142 | S | * | 2/2012 | Johnson | D22/132 |
| D708,695 | S | * | 7/2014 | Richards | D22/132 |

(Continued)

*Primary Examiner* — Joshua J Michener
*Assistant Examiner* — Nicole Paige Maccrate
(74) *Attorney, Agent, or Firm* — Dunlap Bennett & Ludwig, PLLC; Anna L. Kinney

(57) ABSTRACT

An aquatic turtle decoy floated out to a chum slick is disclosed. The decoy has a chum ball on its back and includes apertures for dispensing chum, to replenish the chum slick. A silhouette of a turtle floating on an open water surface is visible and attracts game fish below. Sea birds, attracted to the chum ball on the decoy back, often cause a commotion at the open water surface, serving to further attract game fish to the aquatic turtle decoy.

11 Claims, 4 Drawing Sheets

(56) References Cited

U.S. PATENT DOCUMENTS

| | | |
|---|---|---|
| 9,439,407 B2 | 9/2016 | Signitzer |
| 11,399,524 B2 | 8/2022 | Caldeira |
| 11,477,972 B2 | 10/2022 | Troshinsky |
| 2014/0259866 A1 | 9/2014 | Jones |
| 2016/0015014 A1 | 1/2016 | Smith |
| 2016/0309691 A1 | 10/2016 | Ancona |
| 2018/0007878 A1 | 1/2018 | Reid-Jones et al. |

* cited by examiner

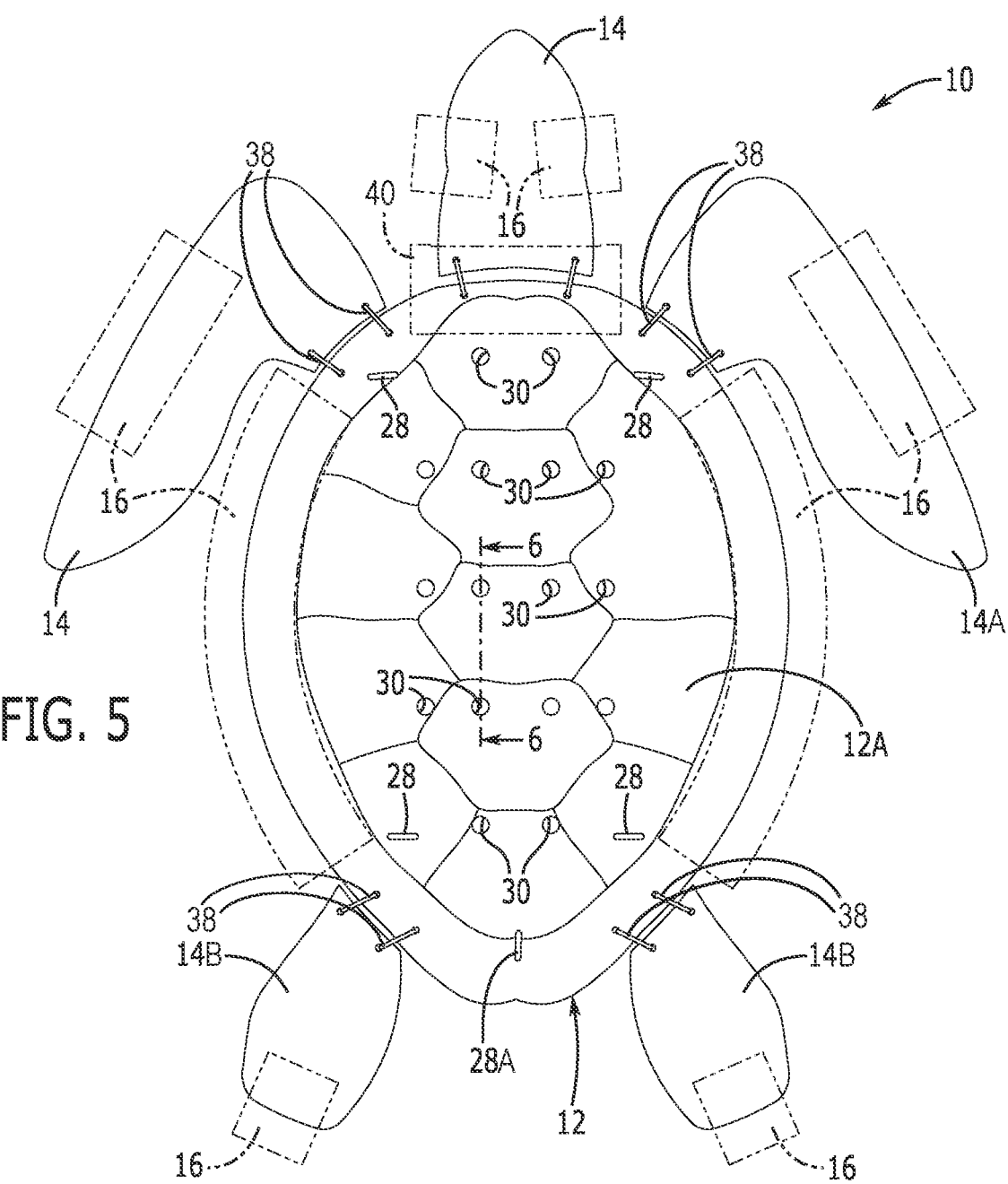
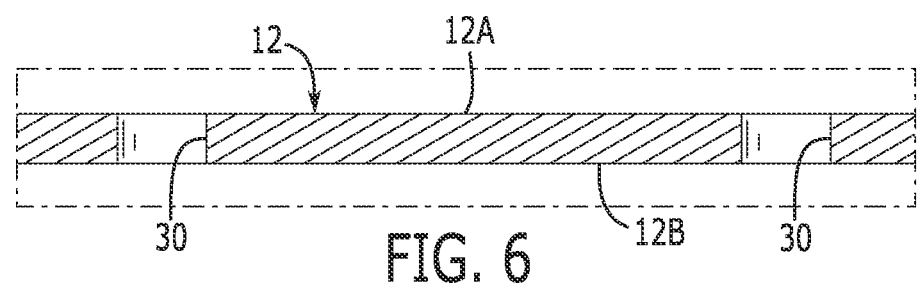

TURTLE DECOY FOR GAME FISHING OR RESEARCH

REFERENCE TO RELATED APPLICATION

The present nonprovisional patent application is based upon provisional patent application bearing U.S. Ser. No. 63/460,772 filed Apr. 20, 2023, hereby incorporated by reference in its entirety for priority purposes, pursuant to Title 35, US Code, Section 120.

FIELD

The present subject matter, in general is directed to a turtle decoy for game fishing or research and more particularly, is directed to a turtle decoy adapted and configured to float on a body of water and dispense chum into the water where wave action is prevalent.

BACKGROUND

Although dispensing chum for attracting fish to a given locality often increases the likelihood that fish are caught by hooks or nets at the locality, it is well known, for those bodies of water where strong currents and tides are prevalent, that the chum can become dispersed, which would not entice fish to long remain in a locality for game fisherpersons.

While U.S. Pat. No. 2,749,647 to Beloff discloses a chum lure in the shape of a fish and while U.S. Pat. No. 2,612,718 to Steinberg and U.S. Pat. No. 3,780,467 to Lueck each disclose variations of a common sort of chum-dispensing float device, these patents do not solve the problem of chum being dispersed where strong currents and tides are found.

U.S. Pat. No. 4,267,658 to Brown et al. discloses a fishing lure having a smell and taste of natural bait, which is said to enable a fisherperson to catch more fish when using it. The '658 fishing lure has a hollow body for containing cut-up or ground chum bait. The body has perforations, enabling chum bait to ooze out into the water surrounding the lure.

U.S. Pat. No. 6,931,785 to Johnson discloses a fishing lure that simulates a turtle body that has at least one metal loop (or "eye") to which a fishhook can be attached. The turtle body disclosed in the '785 patent has a device for dispensing a fish-attracting scent. US published patent application No. 2016/0015014 to Smith also discloses a fishing lure that simulates a turtle body containing a fish-attracting composition and is equipped with a red-eared slider fishing lure. While these patent references each disclose fish-attracting substances, neither discloses dispensing chum to attract fish to where people are fishing.

Chumming is the blue water fishing practice of throwing meat-based ground bait called "chum" into the water for luring various marine animals (usually large game fish) to a designated fishing ground, so that targeted animals are more easily caught by hooking or spearing. Chum typically comprises fresh chunks of fish meat with bone and blood, the scent of which attracts predatory fish, particularly sharks, billfishes, tunas, and groupers.

A "chum slick," when used to attract fish by scent only in bodies of water where game fish can be found, has a limited utility since chum, over time, is dispersed by wave action, drifts away from game fishing boats, and is caused by gravity to fall to the bottom.

The prior art reviewed and summarized above does not disclose or even suggest ways to solve this problem and avoid the frustration experienced by game fisherpersons.

SUMMARY

The present subject matter is directed to an aquatic turtle decoy designed to be floated out to or otherwise maneuvered closely adjacent to, preferably directly over, a chum slick. Embodiments of the turtle decoy of the present subject matter can be adapted and configured for various game fishing purposes. Oceanic research purposes and game fishing research purposes are illustrative of its utility. The decoy, having a chum ball on its back, includes several features to solve the chum-dispersal problem noted. The decoy, adapted and configured to dispense more chum, thereby replenishes the chum slick. The silhouette of a turtle floating on the surface is visible, also attracting game fish located below. Birds, attracted to the chum ball atop the decoy, will often cause a commotion at the surface, serving to further attract game fish to the turtle decoy floating on the surface. Additional features of the present subject matter are disclosed in the detailed description.

BRIEF DESCRIPTION OF THE FIGURES

FIG. 5 depicts a detailed underside plan view of the embodiment shown in FIG. 2.

FIG. 6 is a side elevational sectional view, showing a feature of the present subject matter, on an enlarged scale relative to FIGS. 1-5, from the plane 6-6 shown in FIG. 5.

Throughout the figures and detailed description of this patent specification, I shall use similar reference numerals to refer to similar elements of the present subject matter.

DETAILED DESCRIPTION

Embodiments of the present subject matter can be adapted and configured to be used, e.g., by marine biologists to attract game fish for various marine research purposes.

Figure 1:
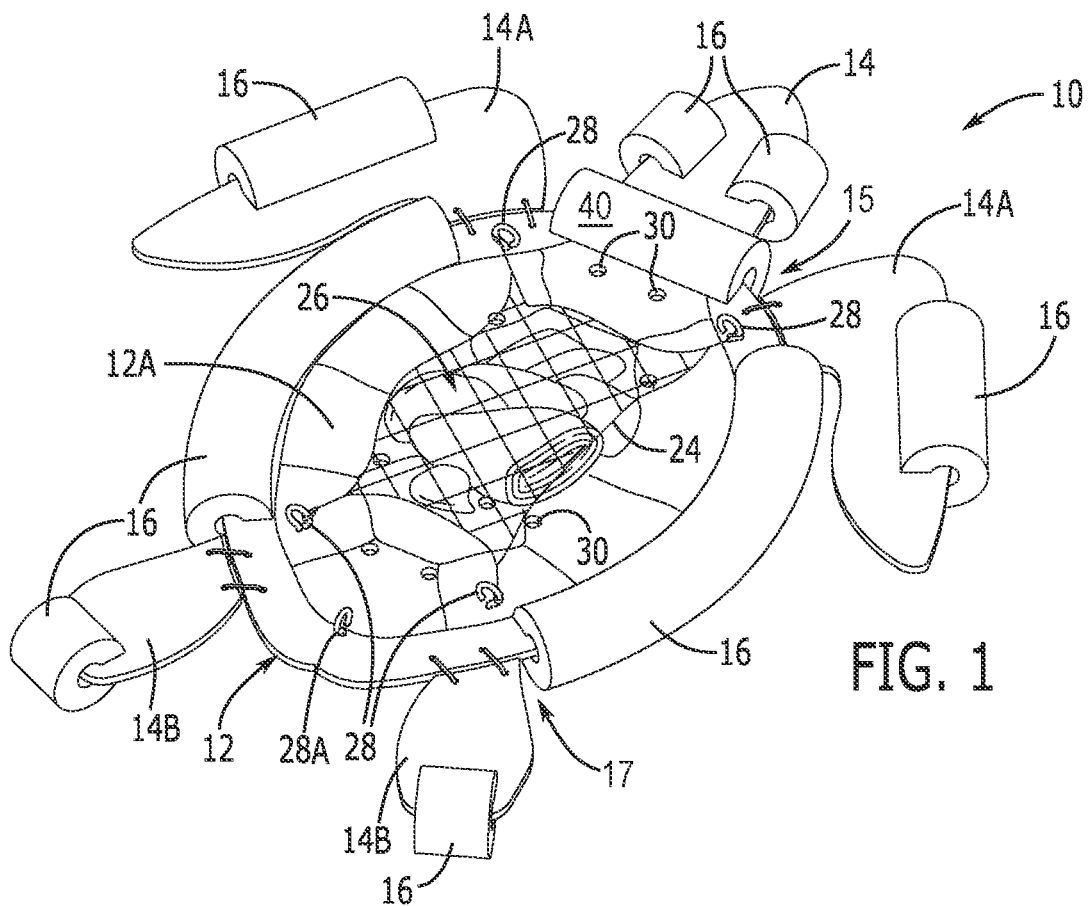
FIG. 1 presents an upper perspective view of an embodiment of an articulated turtle decoy for game fishing or research in accordance with the present subject matter.
Figure 2:
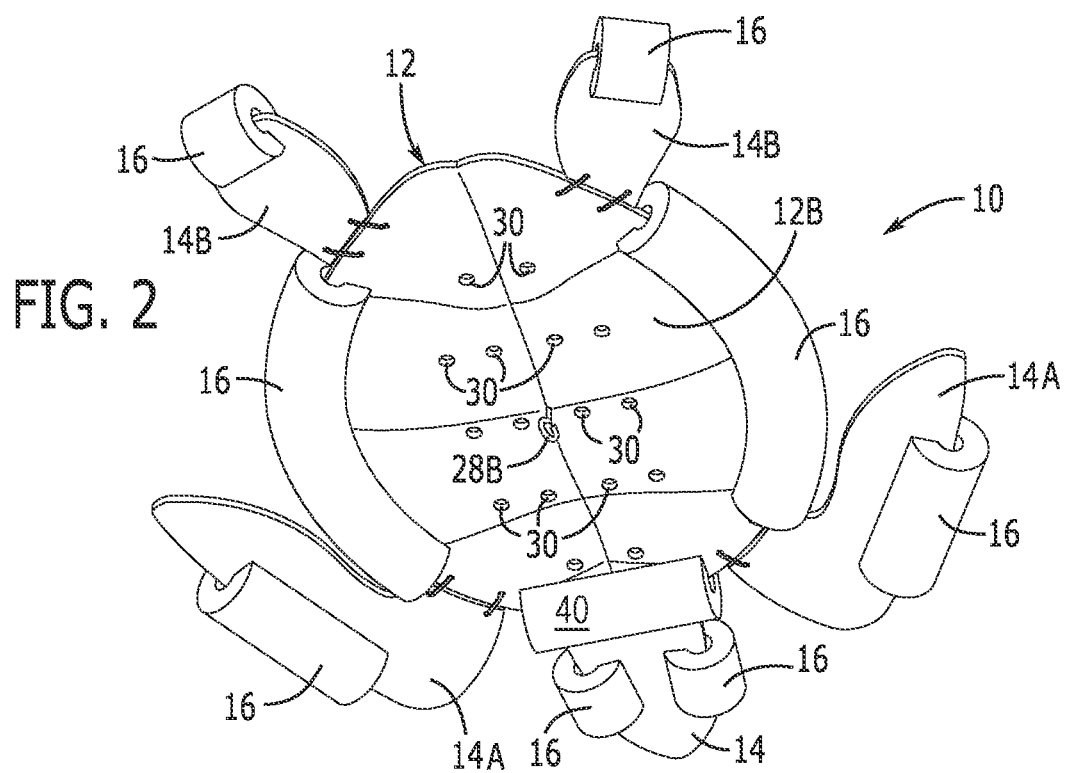
FIG. 2 depicts an underside perspective view of the embodiment shown in FIG. 1.
Figure 3:
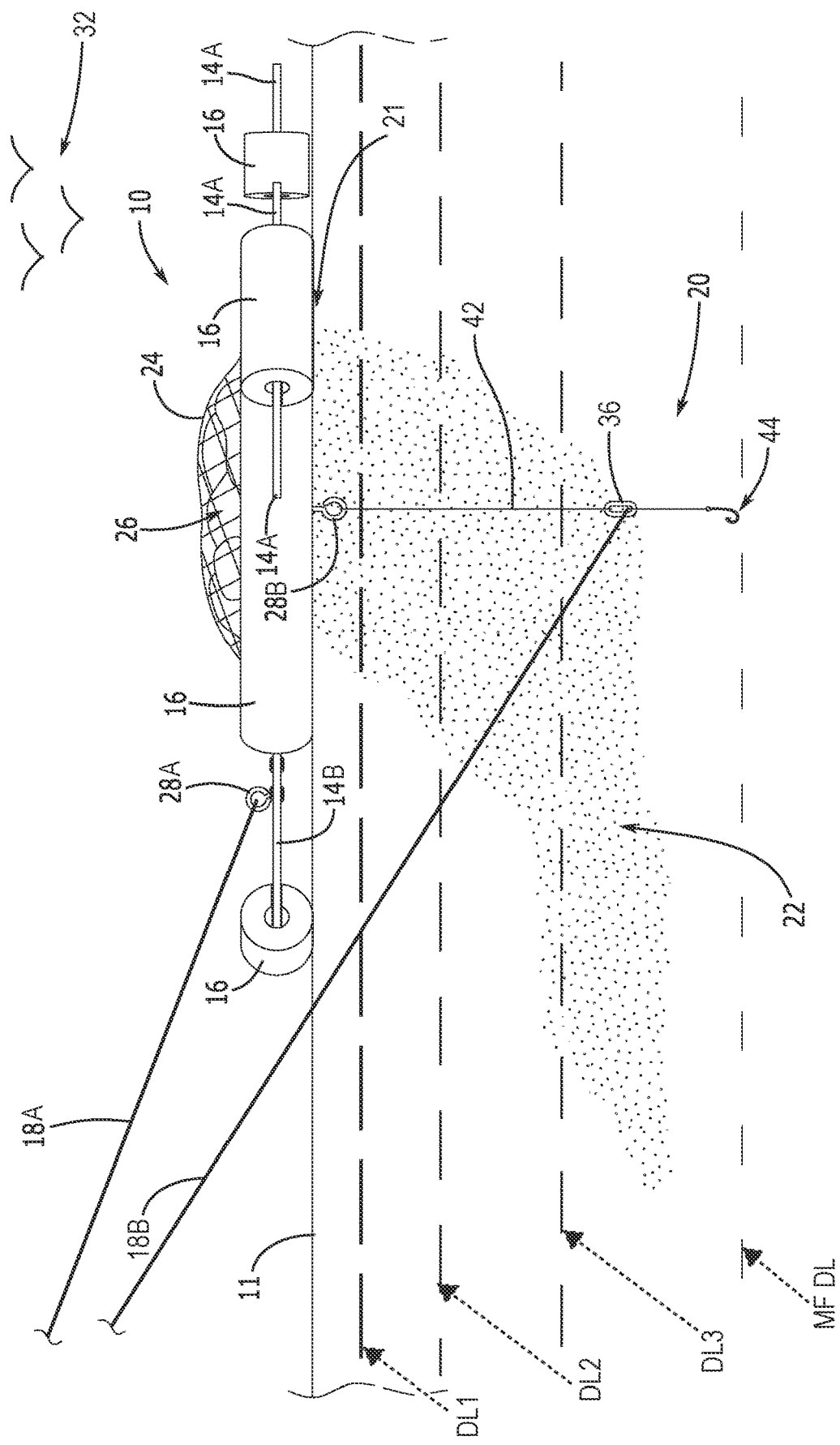
FIG. 3 presents a lateral view of the embodiment depicted in FIGS. 1, 2 floating on the surface of a body of water in a region where chum is drifting away from a chum slick.

Referring initially to FIGS. 1-3, an aquatic turtle decoy 10 adapted and configured for game fishing on or adjacent to a chum slick 21 on a surface 11 of open water shall now be described in detail. Throughout this patent specification, the term "open water" shall be understood to mean a body of fresh or salt water where game fish can be found.

The aquatic turtle decoy 10 includes an aquatic turtle body 12 having an upper surface 12A which includes a plurality of apertures 30 (FIG. 6) through the body 12. The aquatic turtle decoy 10 also includes a pair of spaced-apart front appendages or flippers 14A movably secured to a first region 15 of the body 12 for simulating movement, relative to the body 12, when "triggered" or caused by wave motion along the surface 11 of the open water. The turtle decoy 10 of the present subject matter further includes an aquatic turtle head 14 secured to the body 12 and disposed between the front appendages or flippers 14A. The turtle decoy 10 also includes a pair of spaced-apart hind appendages or flippers 14B movably secured to a second region 17 of the body 12 for simulating movement, relative to the body 12, when caused by wave motion along the surface 11 of the body of open water. The turtle decoy 10 also includes a plurality of chum particles 26 secured to the upper surface 12A adjacent to at least a portion of the plurality of apertures 30. Each aperture 30 is sized to enable at least a portion of the chum particles 26 to pass through the body 12 to the surface 11 of the open water, to replenish the chum slick 21.

The aquatic turtle decoy 10 of the present subject matter further includes a sheet of netting 24, preferably made of a noncorrosive durable material, e.g., nylon, with netting strands that are adapted and configured for securely retaining all the chum particles 26—also referred to as a "chum ball"—to the topside or upper surface 12A of the body 12 of the aquatic turtle decoy 10, for attracting nearby sea birds 32 to the chum particles 26.

Figure 4:
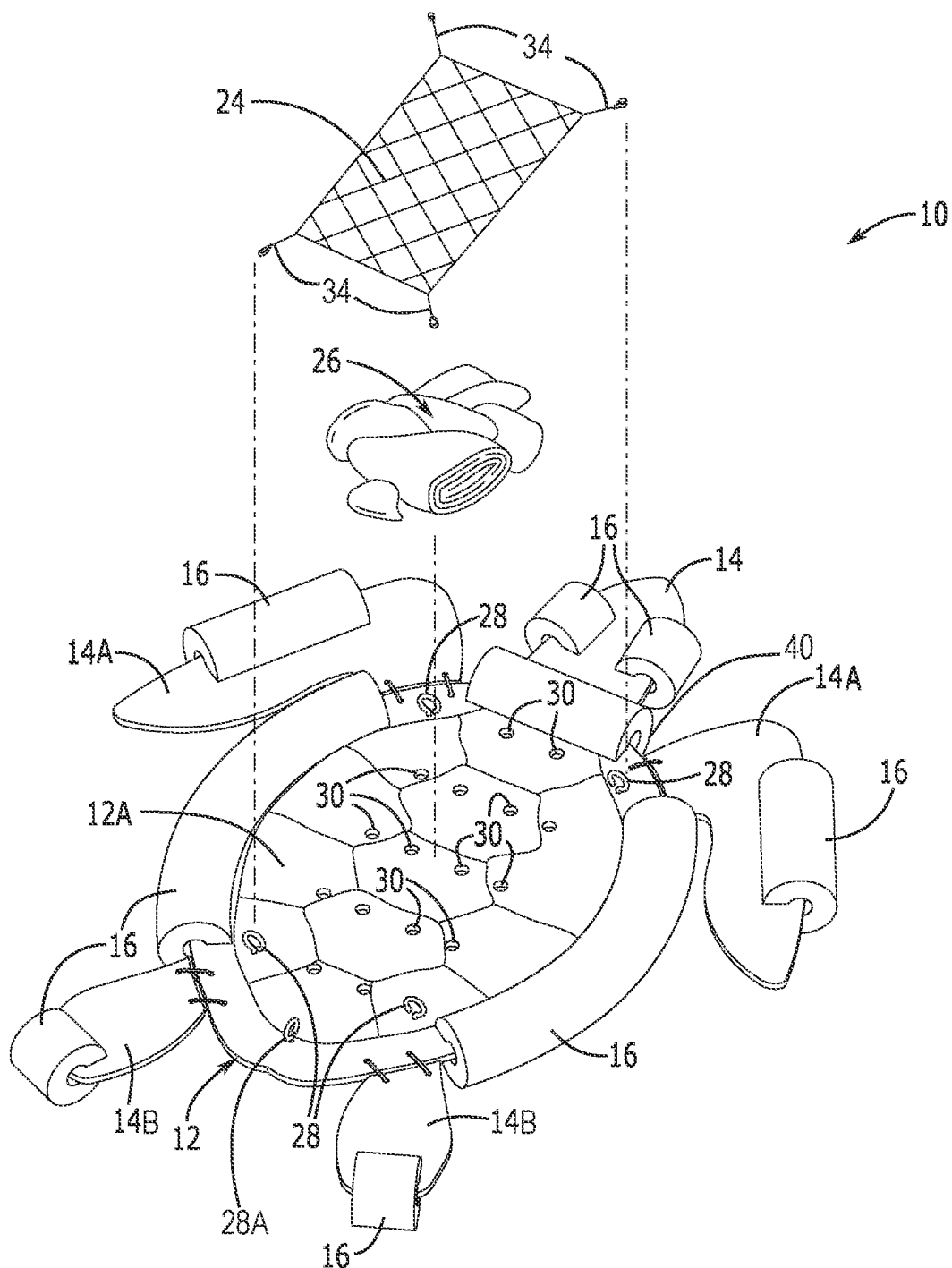
FIG. 4 is an exploded upper perspective view of the embodiment shown in FIG. 1.

In embodiments of the present subject matter, the sheet of netting 24 includes a plurality of integral ties 34, each of predetermined length, and the body 12 includes a plurality of eyehooks 28 fixed to the upper surface 12A at preselected locations, for enabling each of the plural ties 34 to be fixed to an associated one of the eyehooks 28. In a preferred embodiment (FIG. 4), the sheet of netting 24 is rectangular, includes an integral tie 34 at each corner portion, and each tie 34 is fixed to one of the eyehooks 28.

As an optional feature, the aquatic turtle decoy 10 of the present subject matter can also include an additional eyehook 28A, preferably made of a noncorrosive metal and fixed to a hind portion of turtle body 12, for securing a predetermined length of extendable and retractable fishing line 18A to the turtle decoy 10, for enabling maneuvering the decoy 10 atop a pre-existing chum slick 21 (FIG. 3), for purposes of replenishing a chum field 22 being dispersed beneath the chum slick 21 as a result of wave action at the surface 11. The utility of such a feature is best understood by considering situation where a chum field 22 becomes progressively more dispersed at noted depth levels DL1, DL2 and DL3 (FIG. 3), with each greater depth level becoming further spaced from the chum slick 21.

As another optional feature of the turtle decoy 10 of the present subject matter, the body 12 can have an underside surface 12B, and the decoy 10 can include a stinger rig 20. For such a feature, the aquatic turtle decoy 10 of the present subject matter can include yet another eyehook 28B, also made of a noncorrosive metal, which is fixed to the underside surface 12B, for controllably extending the stinger rig 20 from the body 12.

To facilitate the optional feature noted immediately above, and as yet another optional feature of the aquatic turtle decoy 10 of the present subject matter, the stinger rig 20 can include a carabiner 36 (FIG. 3) to which another predetermined length of controllably extendable and retractable fishing line 18B is secured, to enable a person spaced from the decoy 10 to maneuver the stinger rig 20, in relation to the chum field 22. The carabiner 36 is distanced from the underside of the turtle decoy 10 by a cord 42 of predetermined length. One end of cord 42 is secured to the eyehook 28B. The other end of cord 42 is secured to carabiner 36. A fishing hook 44, part of the stinger rig 20 shown, is located adjacent to a maximum fishing depth level ("MFDL") for this region. In operation, a game fisherperson can controllably reel in the fishing line 18B for drawing the carabiner 36, and attached stinger rig 20, to an underwater region where the chum field 22 is drifting.

A carabiner (or karabiner), often shortened to "biner," is colloquially known as a climbing clip: a specialized type of shackle having a metal loop and a spring-loaded gate used to connect components, quickly and reversibly, principally in safety-critical systems.

As another optional feature of the turtle decoy 10 of the present subject matter, the head 14 has at least one and preferably two pieces of buoyant material 16 fixed thereto.

Since any suitably buoyant composition or material, preferably secured to the turtle decoy 10—including its head 14, front limbs 14A, and hind limbs 14B—for game fishing purposes, a reference numeral "16" is used, regardless of "where" secured to a decoy 10.

And since research purposes (noted above) will likely follow current environmental standards, it is recommended that The Ocean Conservancy, a nonprofit environmental advocacy group based in Washington, D.C., be asked to provide subject matter experts ("SMEs") qualified to recommend current environmentally acceptable buoyant materials.

As yet another optional feature of the turtle decoy 10 of the present subject matter, each front appendage 14A has at least one C-shaped cylindrical piece of buoyant material 16 frictionally secured to upper and lower surface portions of each such appendage 14A.

As still another optional feature of the turtle decoy 10 of the present subject matter, each hind appendage 14B has at least one C-shaped cylindrical piece of buoyant material 16 frictionally secured to upper and lower surface portions of each such appendage 14B.

As yet another optional feature, the aquatic turtle decoy 10 of the present subject matter can include at least one and preferably two loops of cord 38 (FIG. 5) joining at least one and preferably both of the front appendages or flippers 14A to the body 12, for enabling one or both front appendages or flippers 14A to move relative to the body 12.

As still another optional feature, the aquatic turtle decoy 10 of the present subject matter can similarly include at least one and preferably two loops of cord 38 (FIG. 5) joining at least one and preferably both hind appendages or flippers 14B to the body 12, for enabling the one or both hind appendages 14B to freely move relative to the body 12.

As another optional feature, the turtle decoy 10 of the present subject matter can include a C-shaped cylindrical piece of buoyant material 40 (FIG. 1) frictionally secured to upper and lower surface portions of body 12, for securing the head 14 to the body 12.

Illustrated and described in this patent specification is an aquatic turtle decoy adapted for game fishing or research. While the present subject matter has been described with reference to exemplary embodiments, the present subject matter is not limited to these embodiments. On the contrary, numerous alternatives, changes, and/or modifications shall become apparent to a person of ordinary skill in the art ("POSITA") after this patent specification and its associated figures have been reviewed. Therefore, all alternatives, changes, and modifications are to be treated as forming a part of the present subject matter insofar as they fall within the spirit and scope of appended claims.

What is claimed is:

1. A turtle decoy (10) adapted and configured for game fishing on a chum slick (21), wherein the chum slick (21) is located on a surface (11) of open water, comprising:
   an aquatic turtle body (12) having an upper surface (12A) defining a plurality of apertures (30) therethrough;
   a pair of spaced-apart front appendages (14A) movably secured to a first region (15) of the body (12) for simulating movement caused by wave motion on the surface (11);
   a head (14) disposed between the front appendages (14A);

a pair of spaced-apart hind appendages (14B) movably secured to a second region (17) of the body (12) for simulating movement caused by wave motion on the surface (11); and a sheet of netting (24) dimensioned and configured for securing a plurality of chum particles (26) secured to the upper surface (12A), and for attracting nearby birds (32) to the chum particles (26), adjacent to at least a portion of the plurality of apertures (30), wherein the plural apertures (30) are each sized for enabling at least a portion of the chum particles (26) to pass to the surface (11) of open water, for replenishing the chum slick (21).

2. The turtle decoy (10) of claim 1, wherein the aquatic turtle body (12) has an underside surface (12B), wherein the decoy (10) further includes: a stinger rig (20); and an eyehook (28B) fixed to the underside surface (12B), for extending the stinger rig (20) therefrom.

3. The turtle decoy (10) of claim 2, wherein the stinger rig (20) includes a carabiner (36) to which a predetermined length of extendable and retractable fishing line (18B) is secured.

4. The turtle decoy (10) of claim 1, wherein the sheet of netting (24) defines a plurality of integral ties (34), and wherein the body (12) includes a plurality of eyehooks (28) fixed to the upper surface (12A) at preselected locations for enabling each one of the plural ties (34) to be secured to an associated one of the plural eyehooks (28).

5. The turtle decoy (10) of claim 1, including an eyehook (28A) fixed to the body (12), for securing a predetermined length of extendable and retractable fishing line (18A) thereto.

6. The turtle decoy (10) of claim 1, wherein the head (14) has at least one piece of buoyant material (16) secured thereto.

7. The turtle decoy (10) of claim 1, wherein each front appendage (14A) has at least one piece of buoyant material (16) secured thereto.

8. The turtle decoy (10) of claim 1, wherein each hind appendage (14B) has at least one piece of buoyant material (16) secured thereto.

9. The turtle decoy (10) of claim 1, further including at least one loop of cord (38) joining one of the pair of front appendages (14A) to the body (12) for enabling the one of the pair of front appendages (14A) to move relative to the body (12).

10. The turtle decoy (10) of claim 1, further including at least one loop of cord (38) joining one of the pair of hind appendages (14B) to the body (12) for enabling the one of the pair of hind appendages (14B) to move relative to the body (12).

11. The turtle decoy (10) of claim 1, further including a piece of buoyant material (40) adapted and configured for joining the head (14) and the body (12) together.

* * * * *